United States Patent
Narayanasamy et al.

(10) Patent No.: US 10,498,595 B1
(45) Date of Patent: Dec. 3, 2019

(54) CONVERGED RESOURCES ACROSS SATELLITE NODES

(71) Applicant: Vector Launch Inc., Tucson, AZ (US)

(72) Inventors: Senthilkumar Narayanasamy, San Jose, CA (US); John Edward Metzger, Campbell, CA (US); Shaun B. Coleman, San Jose, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

(21) Appl. No.: 16/153,350

(22) Filed: Oct. 5, 2018

(51) Int. Cl.
  *H04W 84/06* (2009.01)
  *H04L 12/24* (2006.01)
  *G06F 9/445* (2018.01)

(52) U.S. Cl.
  CPC ...... *H04L 41/0803* (2013.01); *G06F 9/44505* (2013.01); *H04W 84/06* (2013.01)

(58) Field of Classification Search
  CPC . H04L 41/0803; H04L 41/0654; H04L 41/12; G06F 8/34
  USPC ........................................................ 709/223
  See application file for complete search history.

(56) References Cited

U.S. PATENT DOCUMENTS

| | | | |
|---|---|---|---|
| 9,641,238 B1 | 5/2017 | Coleman et al. | |
| 9,916,270 B2 | 3/2018 | Richardson | |
| 9,929,796 B2 | 3/2018 | Renouard et al. | |
| 10,084,534 B2 | 9/2018 | Coleman et al. | |
| 2014/0092726 A1* | 4/2014 | Khan | H04L 45/64 370/221 |
| 2015/0024677 A1 | 1/2015 | Gopal et al. | |
| 2016/0357525 A1* | 12/2016 | Wee | G06F 8/34 |
| 2018/0013486 A1 | 1/2018 | Irani | |
| 2018/0302290 A1* | 10/2018 | Rahman | H04W 4/70 |

OTHER PUBLICATIONS

International Application No. PCT/US2018/066359, International Search Report & Written Opinion, 10 pages, dated Mar. 15, 2019.

* cited by examiner

*Primary Examiner* — Glenford J Madamba

(57) ABSTRACT

Systems, methods, and software described herein provide enhancements for the deployment and management of converged resources across satellites, aircraft, and ground-based nodes to perform user tasks and applications. In one implementation, a method includes identifying a request for a logical node and identifying physical requirements of the logical node. The method further includes selecting physical nodes from a plurality of physical nodes to support the physical requirements of the logical node and distributing configuration data to the physical nodes to implement the logical node.

18 Claims, 11 Drawing Sheets

CONVERGED RESOURCES ACROSS SATELLITE NODES

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station. Although satellites and aircraft can both be configured to perform specialized operations, this equipment is typically custom-made to the particular tasks and is expensive to create and deploy, especially for organizations that may not be able to justify the use of an entire custom satellite or aircraft. As a result, organizations may avoid the use of this technology, limiting its use.

OVERVIEW

The technology described herein improves the deployment and management of converged resources across satellites, aircraft, and ground-based nodes to perform user tasks and applications. These converged resources can be allocated or distributed dynamically to one or more user-defined nodes which can comprise software-defined satellites, software-defined drones, software-defined vessels, or other software-defined mobile entities. In one implementation, a control system identifies logical user requests for resources of a converged system comprised of satellite devices, aircraft devices, and ground-based devices, among other devices. In response to the requests, the control system identifies physical nodes in the converged system to support the requests and distributes configuration data to the physical nodes to implement one or more logical nodes which draw on resources among the physical nodes of the converged system.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
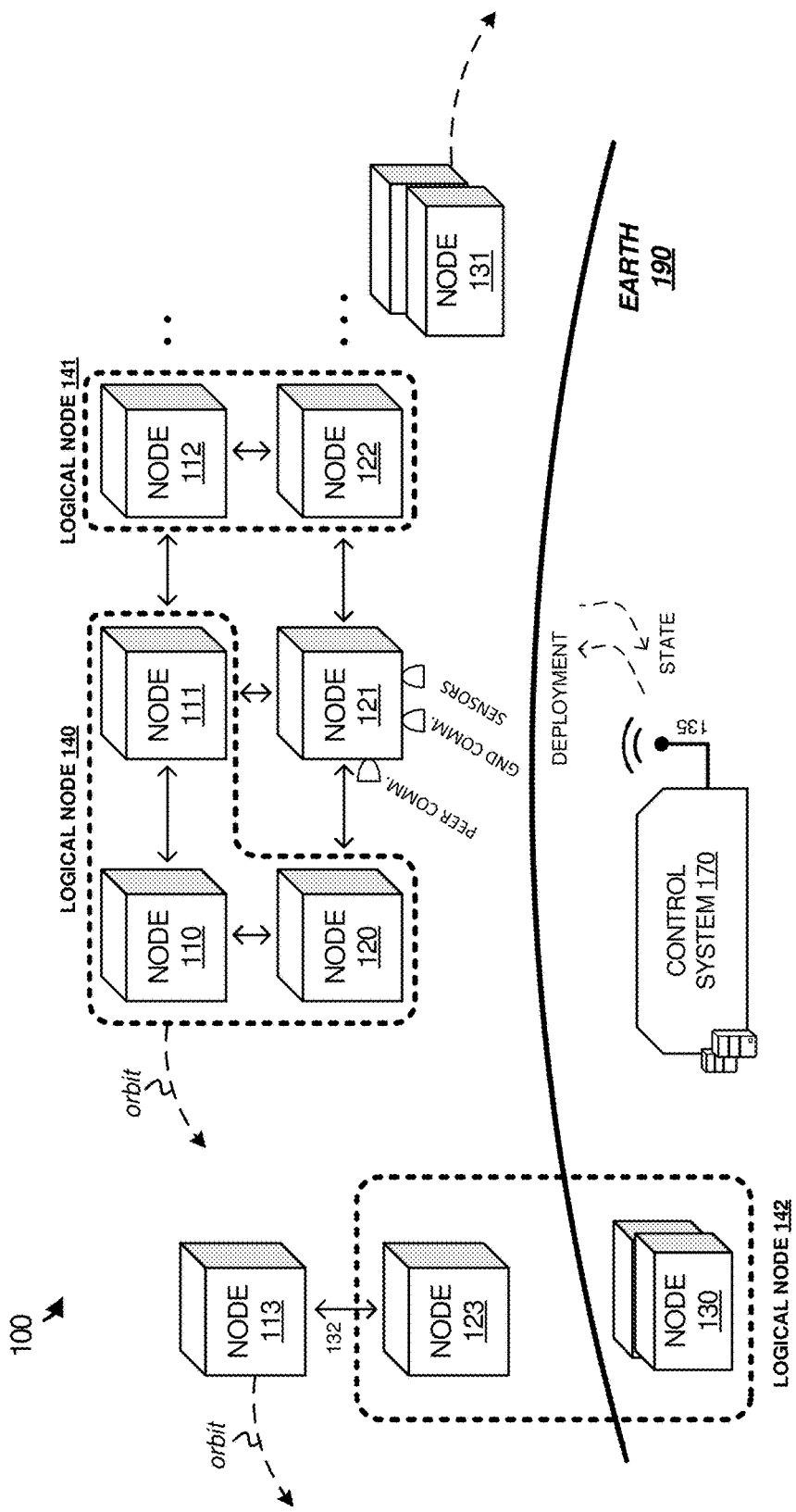
FIG. 1 illustrates a converged system according to an implementation.

FIG. 1 illustrates a system 100 for logical nodes according to an implementation. System 100 includes physical nodes (nodes) 110-113, 120-123, and 130-131, control system 170 and Earth 190. Physical nodes 110-113 and 120-123 are representative of satellite nodes that may orbit the planet in various orbital configurations. Physical node 131 is representative of an atmospheric node, such as an aircraft, airplane, drone, a balloon, or some other similar airborne object capable of data processing and/or gathering sensor observation data. Physical node 131 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed.

In operation, physical nodes 110-113, 120-123, and 130-131 are deployed to provide various operations for different tenants of system 100. These operations may include military, commercial, government, and civilian observation or monitoring operations, communications operations, navigation operations, weather operations, and research operations. In implementing the operations for the various tenants, control system 170 may provide an interface to the tenants, permitting the tenants to define target requirements and applications for the required operations. In some implementations, the target requirements may comprise processing resource requirements (type of processor, quantity of cores, and the like), storage requirements (quantity of storage, type of storage, and the like), communication requirements (bandwidth, throughput, target frequencies, and the like), sensor requirements (sensor type, sensor quality, and the like), geographic location requirements (defined objects and/or geographic regions of interest), or some other similar requirement. From the target requirements, an application may be developed that uses the target requirements to provide the desired functionality. As an example, a tenant may generate an application that requires at least a minimum quality or types of imaging sensors, at least a minimum quantity of processing resources, and at least a minimum amount of storage. An example application may be used to monitor vehicular traffic within a defined geographic region, where the application may use the imaging data to identify particular traits in the traffic and report the information to control system 170.

In some examples, the target requirements may be incapable of being implemented on a single physical node among physical nodes 110-113, 120-123, and 130-131. As will be discussed herein, one or more software-defined nodes, referred to herein as logical nodes, may be generated that utilize portions of physical resources of multiple nodes among nodes 110-113, 120-123, and 130-131. As illustrated in system 100, at least a portion of the resources of physical nodes 110-111 and 120 correspond to a first logical node 140, at least a portion of the resources of physical nodes 112 and 122 correspond to a second logical node 141, and at least a portion of the resources of physical nodes 123 and 130 correspond to a third logical node 142. Although demonstrated as separate, portions of the logical nodes may be co-located on the same physical nodes. For example, a first logical node may employ the use of a first sensor of a physical node, while a second logical node may employ the use of a second sensor of the same physical node, or may employ the use of a third sensor of a different physical node.

In developing an application for system 100, a tenant may develop an application as though the application were executing on a single physical node. However, upon deployment, the application operations and physical resources may be distributed across multiple physical nodes among nodes 110-113, 120-123, and 130-131. To manage the execution of each of the applications and the interaction with physical resources, such as communication systems and sensors, physical nodes 110-113, 120-123, and 130-131 may execute an application management platform, such as hypervisor or operating system, capable of directing requests to the appropriate physical node. As an example, for logical node 141, an application may execute on physical node 112, but employ the use of a sensor that is located on physical node 122. Because of this example configuration, when a request is generated by the application on physical node 112, the application management platform may identify the request and direct the request to physical node 122, where physical node 122 may obtain desired data from the sensor of physical node 122 and return the required data to the application on physical node 112.

In one example, a sensor for a logical node might not remain consistent during the operation of the logical node. In particular, because of present conditions related to orbital configurations, flight patterns, surface conditions, relative motion, or other similar conditions, sensor availability or status for a particular logical node may dynamically change over time. As a result, when an application executing on a first physical node initially requests data from a target sensor, the requests for sensor data issued by the application may be routed by the application management platform to a first sensor that provides the required functionality as the target sensor. However, due to present conditions, such as movement or failure of individual physical nodes in system 100, requests from the application for the target sensor may instead be routed by the application management platform during a subsequent request to a second sensor that provides the required functionality. As a result, applications may only be required to address a single target sensor, while the application management platform identifies and directs communications to the appropriate physical sensors that are allocated to the logical node.

Figure 2:
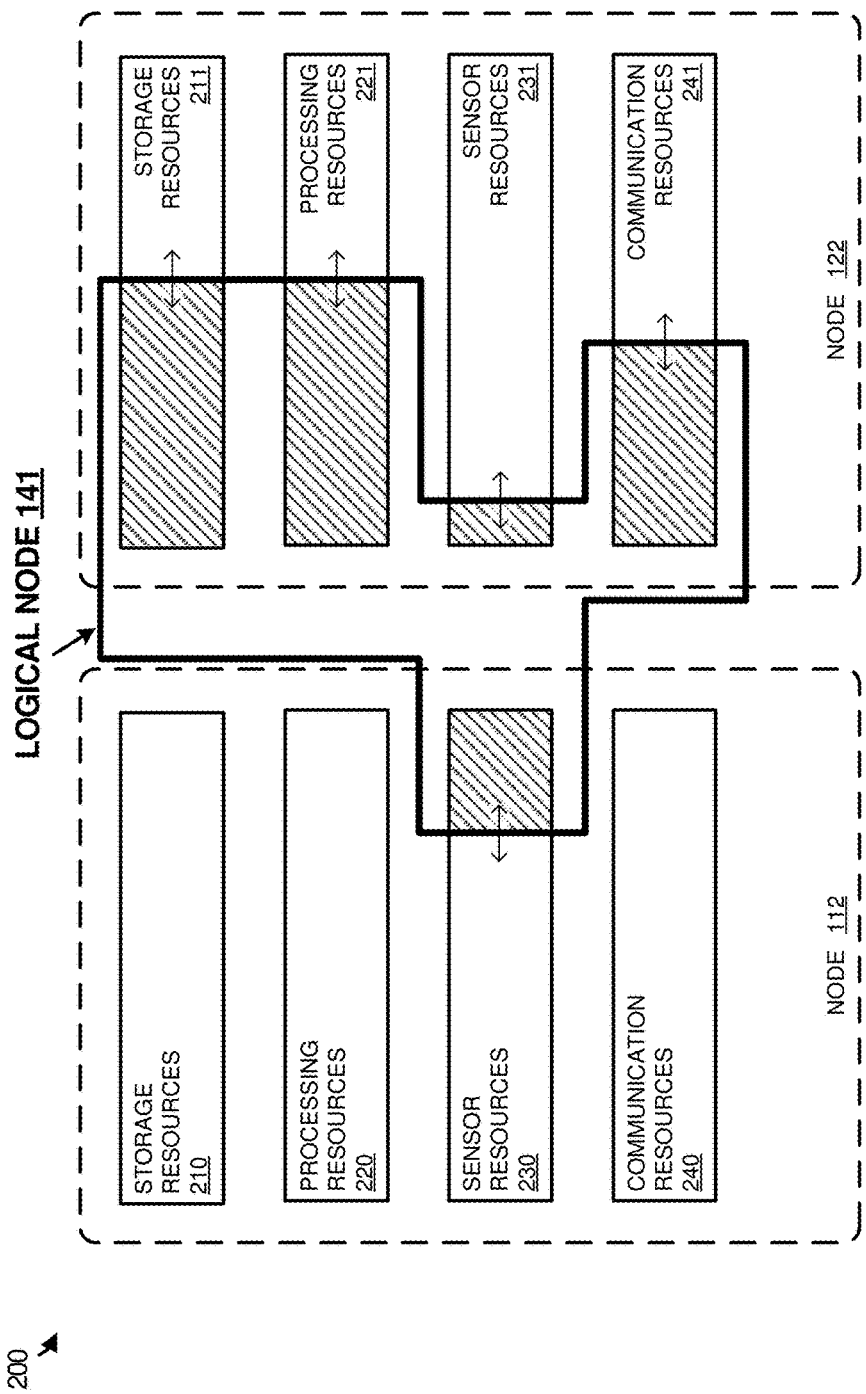
FIG. 2 illustrates resource allocation of a logical node according to an implementation.

FIG. 2 illustrates overview 200 indicating allocations of physical resources to a logical node according to an implementation. Overview 200 includes physical nodes 112 and 122, which provide the resources for logical node 141 depicted in system 100 of FIG. 1. Nodes 112-122 further include storage resources 210-211, processing resources 221-222, sensor resources 230-231, and communication resources 240-241.

As described herein, a converged system may employ a variety of physical nodes that each include various associated component configurations. In some implementations, a single physical node may be individually incapable of providing the desired operations for an application or task defined by a tenant of the system. As a result, an application or task may be deployed on a logical node that executes across resources of multiple physical nodes of the system. In allocating the resources of physical nodes, a management system, such as control system 170 of FIG. 1, may identify resource requirements associated with the application or task to be deployed and determine physical nodes in the converged system capable of supporting the resource requirements. These resource requirements may include processing resource requirements, storage resource requirements, sensor resource requirements, geographic location requirements, communication requirements, or other requirements provided by one or more of the physical nodes.

Once the physical nodes are identified with resources to support the application/task, control system 170 may initiate distribution of the resources to the application/task. Referring to the example of logical node 141, to provide the requirements of an application, portions of storage resources 211, processing resources 221, and communication resources 241 are allocated to the logical node to provide the desired operations. Additionally, logical node 141 includes sensor resources 230-231 that are distributed across physical nodes 112 and 122. To manage the communication between the application executing on physical node 122 and sensor resources 230 available on physical node 112, an application management platform may identify data requests for the application and forward the requests to the appropriate resource. As an example, the application executing on physical node 122 may generate a request to obtain sensor data from a sensor in sensor resources 230. In response to the request, the application management platform may determine that the sensor is not local to physical node 122, and may forward the request to a second application management platform executing on physical node 112. The application management platform on physical node 112 may interact with the required sensor to obtain the data and forward the data to the application executing on physical node 122. Advantageously, this permits the application executing on physical node 122 to be executed without knowledge of the physical locations of the sensors. Rather, the application management platform may be used to translate requests and provide access to the required resources for the application. Thus, even if a first sensor is allocated to the logical node that is then migrated to a second sensor to provide the desired operations, the migration may be transparent to the application. Instead, the application management platform may be used to direct the requests to the newly allocated sensor.

In some implementations, in managing the communications between physical nodes 112 and 122, a secure communication network may be established for logical node 141. This secure communication network may be used to communicate data to and from sensor resources 230. In at least one example, the application management service on logical node 141 may identify a request for a sensor of sensor resources 230. In response to the request, the application management service may encapsulate the request in one or more packets and communicate the one or more packets to the application management service for physical node 112. Once the packet(s) is received by the application management service on physical node 112, the application management service may decapsulate the packet to identify the request and obtain the requested data from the corresponding sensor in sensor resources. In at least one implementation, when the packet is obtained by the application management service on physical node 112, the application management service may determine whether the request is valid or permitted by logical node 141. This determination may be based on an application identifier associated with the packet, source and destination physical node identifiers included with the packet, the secure communication network (logical network identifier) over which the packet was received, a hash included in the packet, any security keys included in the packet, or some other similar mechanism. Accordingly, when the request is verified as permitted to access the corresponding sensor, the appropriate data may be obtained from the sensor. In contrast, if the request is not permitted, such as when the application does not have access to the sensor, the request may be blocked, and no data may be obtained from the sensor.

In at least one implementation, in generating the packet to be communicated between physical nodes, the application management service may encrypt the data payload using an encryption key associated with the logical node. A header may then be added to the packet that can identify the source and destination physical nodes for the communication, the identity of the logical node associated with the packet, or any other addressing information. Once the packet is generated, the packet may be forwarded to the destination physical node, where the destination physical node may use the information in the header to identify an encryption key to decrypt the payload and perform the required action. Thus, when allocating the physical nodes to support a logical node, each of the physical nodes may be configured with encryption information that permits packets to be encapsulated and decapsulated at the various physical endpoints. The encryption methodology might comprise various encryption processes, such as symmetric encryption algorithms, asymmetric encryption algorithms, block ciphers, public key infrastructure (PKI) encryption, one-time pad encryptions, Advanced Encryption Standard (AES), RSA encryption, public-key cryptography, or Triple Data Encryption Standard (3DES), among others.

Once the data is obtained from the sensor, the application management service on node 112 may generate at least one secondary packet that returns the sensor data to the application management service on physical node 122. Once the at least one secondary packet is obtained at the application management service on physical node 122, the at least one secondary packet may be decapsulated to provide the required data to the application executing thereon. Advantageously, the implementation of a transparent secure network permits an application on a first physical node to access sensors, storage, and other similar resources from other physical nodes as if the resources were local to the first physical node. The application management platform may be responsible for establishing the secure connection with the other physical nodes that correspond to the logical node and may provide the required communications between the physical nodes. In some implementations, the application management platform may provide each of the applications with information about the sensor resources, storage resources, and communication resources that are allocated to the application for the logical node. The applications may then interact with the available resources as though the resources are local to the physical node executing the application. However, the application management service may provide the communication interactions between the physical nodes to support the application of the logical node. Although demonstrated in the example of FIG. 2 as accessing sensors across satellites, similar operations may be used in interacting with storage, communication, and other resources not located on the physical node with the executing application.

Figure 3:
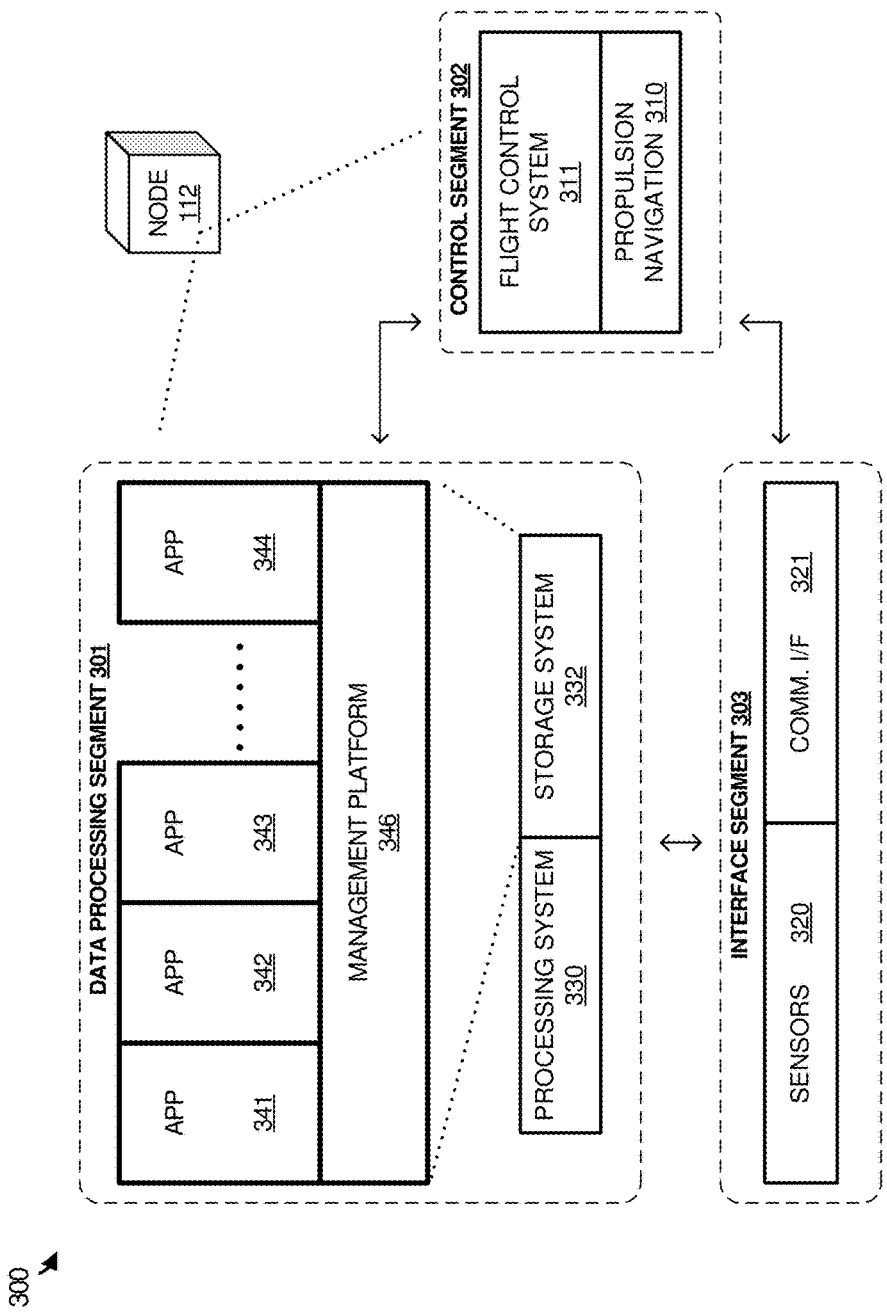
FIG. 3 illustrates an expanded view of a physical node according to an implementation.

FIG. 3 illustrates an expanded view 300 of physical node 112 of FIG. 1 according to an implementation. Physical node 112 can be an example of any of nodes 110-113, 120-123, and 130-131 of FIG. 1, although variations are possible. Physical node 112 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, tenants of a converged system may generate applications that are deployed as logical nodes across multiple physical nodes in a computing environment. As an example, application 341 may comprise a first application that corresponds to a first logical node, while application 342 may comprise a second application that corresponds to a second logical node. To provide a platform for the applications, application management platform 436 is provided, which is capable of separating data for the various logical nodes executing on physical node 112. As an example, when data requests are generated for an application, management platform 346 may determine whether the resource is local (e.g. a local storage resource, a local sensor, and the like) and access the local data associated with the local resource. Further, when the data is determined to not be local to physical node 112, management platform 346 may identify another node in the system capable of supporting the request and forward the request to the other node in the system. As an example, application 341 may require data from a sensor that is located on another physical node in the system. To support the request, management platform 346 may determine a remote physical node that includes the required sensor and forward a communication using communication interface 321 to the remote physical node to obtain the required data.

In some implementations, management platform 346 may operate transparently to provide the required interactions of the applications with the sensors, communication interfaces, and storage for the application. As an example, application 341 may be written in a manner that is independent of the location of the sensors and may be written as though the sensors are local to node 112. As a result, although the sensors may be located on a different physical node, management platform 346 may identify requests to the sensor and present data from the sensor as though the sensor is local to physical node 112.

In addition to the data processing operations provided in data processing segment 301, physical node 112 further includes control segment 302. Control segment 302, which may be communicatively linked to data processing segment 301 and interface segment 303, is responsible for logistical control elements of physical node 112. The operations may include managing the deployment of solar panels on a satellite, managing the positioning of a satellite with regards to the Earth or the sun, or any other similar operation. When physical node 112 comprises an aircraft or atmospheric node, then control elements can include flight control systems, power systems, navigation systems, among other elements. When physical node 112 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the sensor during defined time periods, may jointly obtain data derived from the sensor at the same time (e.g. all logical nodes can access the same imaging data), or may be provided access to sensors at some other interval. In addition to sensors 320, interface segment 303 further includes communication interface 321 that may be used to communicate with other nodes and/or management systems for system 100. In some examples, communication interface 321 may work with management platform 346 to control logical node communications. Thus, if application 341 required a communication with another physical node to obtain sensor data from the node, communication interface 321 may forward the communication to the appropriate node, and obtain the data from the node.

While demonstrated in the example of expanded view 300 with a physical node, physical nodes may be represented in a variety of forms. These physical nodes may comprise airplanes, balloons, land vehicles (cars, trucks, trains, and the like), water vehicles, or some other similar physical node. These physical nodes may include a data processing segment capable of providing a platform for the applications executing thereon, may comprise a communication interface to communicate with other nodes and/or control systems, and may further comprise one or more sensors capable of gathering required data for the applications executing thereon.

Figure 4:
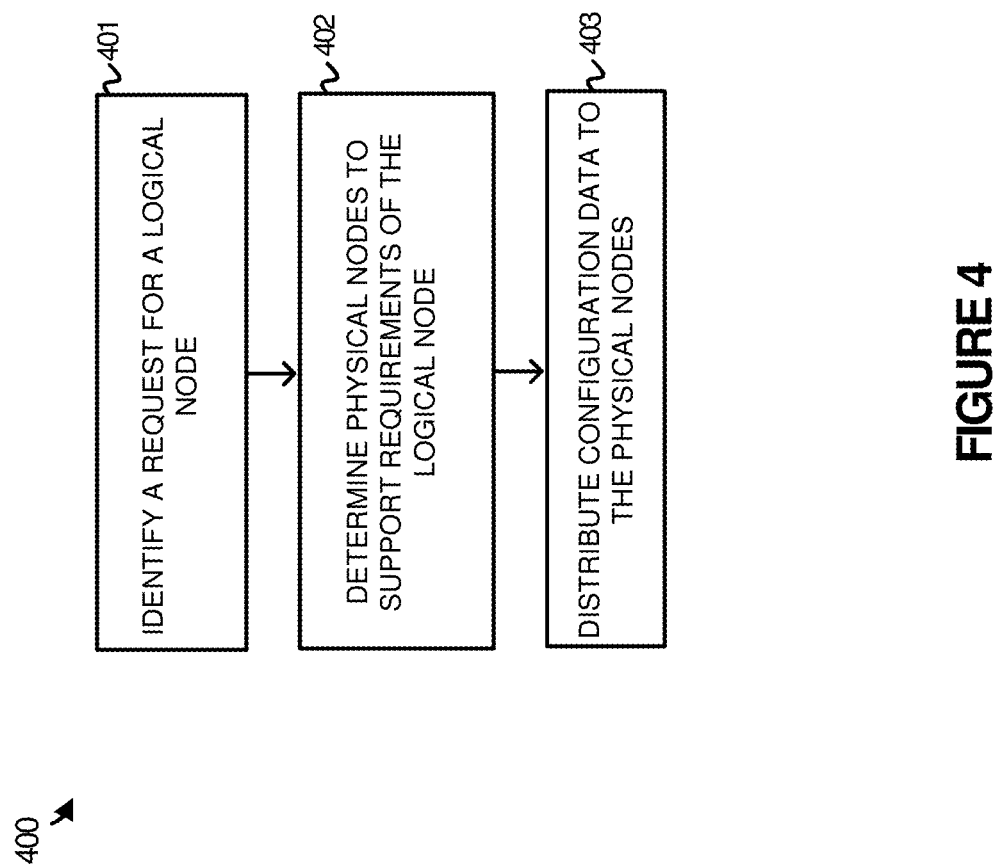
FIG. 4 illustrates an operation to deploy a logical node according to an implementation.

FIG. 4 illustrates an operation 400 to deploy a logical node according to an implementation. Operation 400 is referenced parenthetically in the paragraphs that follow with reference to systems and elements of system 100 of FIG. 1. Operation 400 is an example operation of control system 170.

As depicted in FIG. 4, operation 400 includes identifying (401) a request for a logical node, where the request may indicate resource requirements for the logical node. These requirements may include processing resource requirements, storage resource requirements, communication requirements, sensor requirements, geographic areas or times of interest, or some other similar requirement. In some implementations, in developing an application that will be deployed as part of a logical node, a tenant may specify a minimum quality of service for the application. This minimum quality of service may define a minimum sensor quality, a minimum amount of processing resources, a minimum amount of storage, or some other similar minimum quality of service requirement.

Once the request is identified for the logical node along with the requirements for the logical node, operation 400 further determines (402) physical nodes in system 100 to support the requirements of the logical node. In some implementations, control system 170 may maintain information about the available resources in physical nodes 110-113, 120-123, and 130-131. The resources may include processing resources, storage resources, sensor and communication resources, or some other similar information about the resources. The information about the resources may be determined at least in part on the status of system 100 and the current applications and logical or physical nodes deployed in the system. In particular, if a logical node were already deployed that was exclusively using a sensor, then control system 170 may identify that the sensor is not available for use by another logical node. However, in some examples, control system 170 may be capable of reconfiguring logical nodes in system 100, such that a new logical node may be added to the system.

For example, a logical node may be allocated a first set of resources, however, when another logical node is to be added to system 100, control system 170 may migrate or change the resources that are allocated to the logical node. Thus, if an application associated with the logical node were allocated a first sensor that was provided a quality of service higher than the required minimum quality of service, control system 170 may modify the configuration of the logical node, such that the logical node is allocated a different sensor. This migration of the logical node from a first sensor to a second sensor may permit a second logical to use the previously used first sensor.

In some implementations, when a tenant requests the deployment of a logical node, control system 170 may indicate that system 100 is incapable of providing the required resources for the logical node. These resources may comprise processing resources, storage resources, sensor resources, or some other required resource to support the application of the new logical node. Instead, control system 170 may indicate best available resources or may provide an option to deploy a new physical node to provide the required resources. As an illustrative example, a tenant may generate an application with a first imaging sensor requirement that is unable to be satisfied by the current configuration of system 100. In response to the request, control system 170 may generate suggestions of configurations that can be satisfied by system 100, where the suggestions may include alternative sensor configurations, new sensors to be deployed, or some other suggestion to modify the configuration of the application. From the selection, the tenant may select modifications to their application or configuration, or may generate a new application that is capable of deployment in system 100.

After determining physical nodes to support the requirements of the logical node, operation 400 further distributes (403) configuration data to the physical nodes. In one implementation, in distributing the configuration data, control system 170 may transmit configuration data to a first physical node with a request that the physical node distribute the data to the physical nodes associated with the logical node. The configuration data may include the application and may further include physical resource information that permits the application management platform to control data requests by the application. The physical resource information may include addressing information for sensors of the application, storage resources of the application, or some other similar resource. Accordingly, when the application executes in system 100, the application management platform may provide the application with the required physical resources to implement the desired operation.

In some implementations, the physical resources provided to the deployed logical node may be dynamic. Referring to an example in system 100, logical node 141 may initially be allocated to nodes 112 and 122. However, during the execution of logical node 141, a transition event may occur where at least a portion of logical node 141 may transition to one or more other nodes in system 100. These transition events may include a failure of a physical node, an addition of another logical node, a failure of a sensor, a change in a geographic area of interest, or some other similar transition event. Thus, if node 122 were providing sensors for logical node 141, but encountered a failure, control system 170 or another physical node in system 100 may trigger a transition of the sensors to another physical node with sensors capable of satisfying the requirements of logical node 141. In some implementations, in triggering the transition to another physical node, the application management platform may be modified to direct data traffic to the alternative physical node. Thus, while transparent to the application, the application management platform may identify new data requests and direct the requests to the appropriate physical node with the corresponding sensors.

Figure 5:
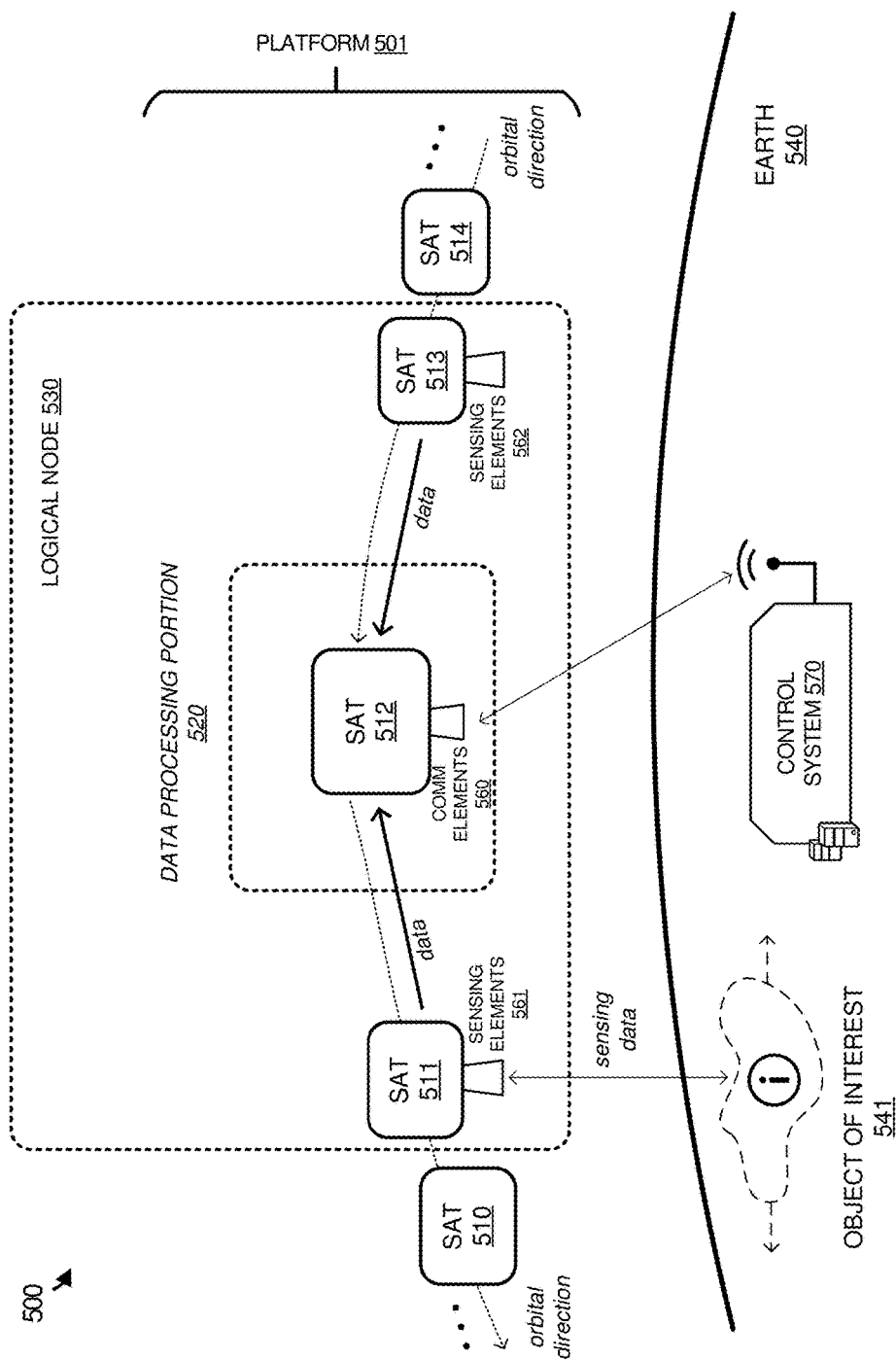
FIG. 5 illustrates an operation of a logical node according to an implementation.

FIG. 5 illustrates an operation 500 of a logical node according to an implementation. Operation 500 includes satellites 510-514, earth 540, control system 570, and object of interest 541. Object of interest 541 may comprise a geographic region of interest, a mobile object, such as a vehicle, or some other similar type of object. Satellites 510-514 are representative of physical nodes that may be employed by a converged resource environment, however, a converged resource environment may use balloons, drones, airplanes, land-based vehicles, water-based vehicles, stationary surface or sub-surface nodes, or other physical nodes.

As depicted in operation 500, satellites 510-514 orbit around Earth 540 and provide converged platform 501, where applications may be deployed as part of logical nodes that can execute on one or more of the physical satellites in platform 501. Here, logical node 530 executes across satellites 511-513, where satellite 512 provides data processing portion 520, and satellites 511 and 513 provide sensing elements 561-562. In managing the operations of logical node 530, each satellite of satellites 510-514 may include an application management platform or service that is responsible for providing hardware access for each of the applications. This hardware may include data storage resources, processing resources, sensor resources, communication resources, or any other similar resource that may be spread over multiple physical satellite nodes. In the example of logical node 530, satellite 512 includes communication elements 560 capable of communicating with control system 570 and further includes processing and storage resources capable of providing data processing portion 520. However, while the data processing and communication resources are located on satellite 512, the application for logical node 530 also requires data from satellites 511 and 513 that is obtained from sensing elements 561-562.

In some implementations, the application of data processing portion 520 may generate a data request associated with a sensor of sensing elements 561-562. In response to the request, which may be identified by the application management platform, the request may be forwarded to satellite 511 to obtain the required data. Once the data is obtained and provided to satellite 512, the application management platform may provide the data to the requesting application as though the sensor were local to satellite 512. In other implementations, rather than generating the request for data, the data may automatically be provided to the one or more applications with access to the sensor. As an example, an imaging sensor may provide unprocessed imaging data to applications across one or more physical satellites using the application management platform. Once obtained by the applications, the applications may process the imaging data to provide the required operations.

In addition to receiving data from satellite 511, data processing portion 520 may further obtain data from at least one sensor in sensing elements 562. In some implementations, logical node 530 may be allocated sensors from satellite 511 at the same time as sensors from satellite 513. In other implementations, the sensor allocation to logical node 530 may be dynamic, in that when satellite 511 can gather the required data for object of interest 541, the sensor or sensors on satellite 511 may be allocated to logical node 530. However, when satellite 511 is not capable of gathering the sensing data for object of interest 541, logical node 530 may be allocated one or more sensors from satellite 513.

In managing the transition of the sensors from satellite 511 to satellite 513, the application management platform may identify the transition event and in response to the event, modify a configuration such that the application on satellite 512 may communicate with the sensing element on satellite 513 using the application management platform. In some implementations, the application on satellite 512 may be configured in such a manner that the change from the one or more sensors on satellite 511 to the one or more sensors on satellite 513 is transparent. To provide the transition, the application management platform may indicate that one or more sensors are available to the application, but translate requests to the one or more sensors into addresses for sensors on either satellite 511 or satellite 513 depending on the orbital state of platform 501.

Figure 6:
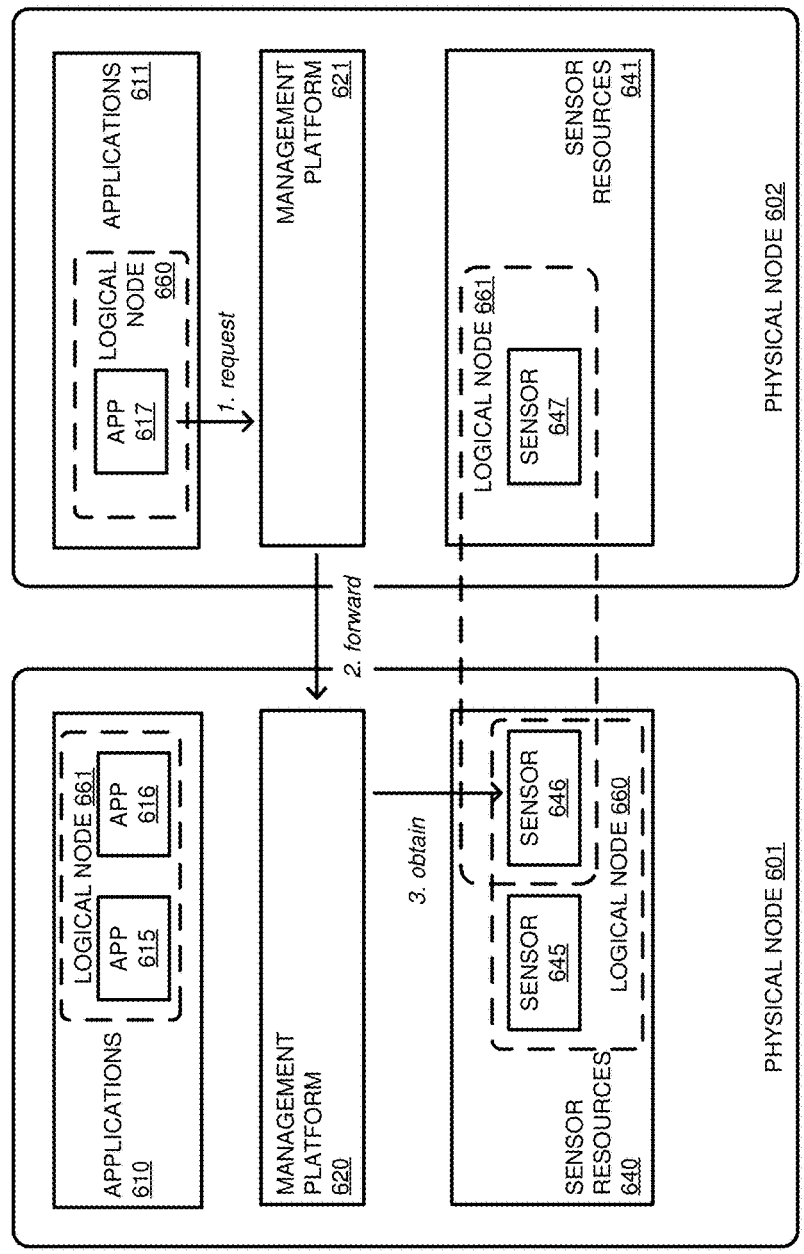
FIG. 6 illustrates an operation of converged system according to an implementation.

FIG. 6 illustrates an operation 600 of a converged system according to an implementation. Operation 600 includes physical nodes 601-602 that each include corresponding applications 610-611, management platforms 620-621, and sensor resources 640-641. Applications 610 includes applications 615-616 that operate as part of logical node 661, and applications 611 includes application 617 that operates as part of logical node 660. Sensor resources 640 includes sensors 645-646 and sensor resources 641 includes sensor 647. Sensors 645-646 correspond to logical node 660, while sensors 646-647 correspond to logical node 661.

As described herein physical nodes in a converged system may be configured with logical nodes that can execute across one or more of the physical nodes. In providing the platform for the execution of the logical nodes, each physical node of physical nodes 601-602 includes a management platform 620-621 that manages the execution of the applications and the interaction with the various physical resources. These physical resources may include storage resources, processing resources, sensor and communication resources, or some other resource. Although logical nodes 660-661 execute using resources from multiple physical nodes, management platform 620-621 may be used to provide access to the various resources as though the resources were local to the same physical node.

Referring to the example in operation 600, application 617 located in applications 611 initiates, at step 1, a request of sensor 646. In response to the request, management platform 621 may determine a location of the required sensor and forward, at step 2, the request to management platform 620 to obtain the required data. Once received at management platform 620, management platform 620 may obtain, at step 3, the data associated with the request from sensor 646 and return the data to management platform 621 and application 617. In generating applications 615-617, the applications may be written with an application programming interface (API) that permits that applications to address the various hardware resources required for the applications. Referring to the example read from sensor 646, application 617 may use an associated identifier for sensor 646 along with an API command to read data from the sensor. In response to the execution of the command, management platform 621 may identify the physical sensor that is associated with the request and forward the request to the appropriate sensor. To forward the request to the appropriate sensors, the application management platform may include lookup tables or other data structures that can identify requests for resources and determine the appropriate locations or addresses of the resources.

As demonstrated in the example of operation 600, sensors (and other physical resources) may be shared by multiple logical nodes. In managing the allocation of physical resources to each of the logical nodes, the application management platform may provide time shares (e.g. a first period of time to logical node 660 and a second period of time to logical node 661) or may provide the same data to each of the logical nodes. In the first example, the management platform may permit logical node 660 to access sensor 646 during a first portion of the orbit and may permit logical node 661 during a second portion of the orbit. In some implementations, each of the applications may be configured to only request data from the sensor during their corresponding time period. However, the management platform may also maintain permissions information for the various logical nodes and provide access to hardware based on the permissions. Thus, while a logical node may be provided with a first configuration that permits access to a sensor, a second configuration may not permit access to the same sensor. Advantageously, the physical configuration of the logical node may be dynamic based on the requirements of the logical node or other logical nodes. In a second example, rather than time sharing a physical resource, logical nodes may use the sensor over the same time period. In these examples, each of the logical nodes may be provided with the same raw data from the sensor, often without a request, and may be processed locally by each of the applications to provide the desired operation.

In at least one implementation, in managing the communications between physical nodes that provide resources to a logical node, the physical nodes may establish a secure network that encapsulates data for transmission between the physical nodes. This encapsulation may be used to encrypt data for the logical node, identify the associated logical node, identify a source physical node, identify a destination logical node, or provide some other operation for the communicated data. As an example, when data from sensor 646 is to be returned to application 617, management platform 620 may obtain the data from the sensor, or a buffer associated with the sensor, and encapsulate the data in at least one packet. This packet may encrypt the sensor data, identify that the packet belongs to logical node 660, identify the source and destination physical node, or provide some other information. Once the sensor data is encapsulated, the packet may be forwarded to application management platform 621 by the inter-satellite communications equipment of satellites 601-602. Once received, management platform 621 may decapsulate the data from the packet and provide the data to the required application. In some examples, in forwarding the data to application 617 management platform 621 may provide the data as though the data were obtained from a local sensor executing on the same physical node as the application.

In some implementations, to maintain security for a logical node and the associated application, the logical node may be associated with encryption information that permits physical nodes, and the application management platforms thereon, to encrypt the payload data of the packets and decrypt the payloads when the packets are received. Thus, when a packet is transferred from physical node 602 to physical node 601 to support an operation of logical node 660, management platform 621 may generate an encrypted payload using an encryption key associated with logical node 660. The payload may then be transferred as an encapsulated packet to management physical node 601 and management platform 620, where management platform 620 may decrypt the packet using an encryption key associated logical node 660. In some implementations, the packet may include an identifier associated with the logical node, where the identifier may be used by the management platform to determine the key that should be used in decrypting the packet.

Figure 7:
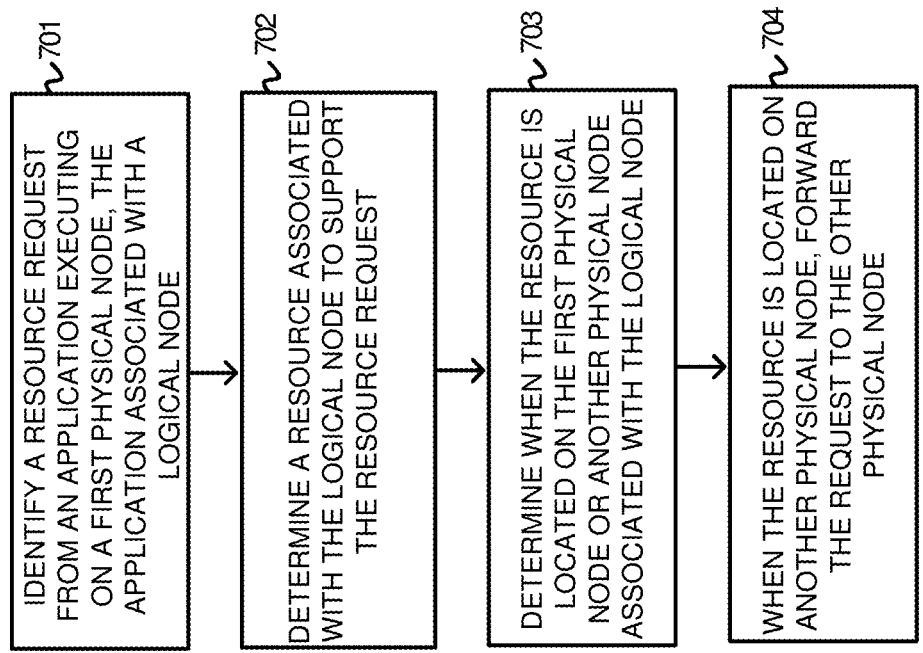
FIG. 7 illustrates an operation of a logical node according to an implementation.

FIG. 7 illustrates an operation of a physical node according to an implementation. The operations of FIG. 7 are referenced parenthetically in the paragraphs that follow with reference to systems and elements of FIG. 6.

In operation, a physical node may execute an application management platform capable of managing the execution of applications on the physical node and the interactions with hardware both locally on the same node as well as hardware on other physical nodes. In the present implementation, a first physical node may identify (701) a resource request from an application executing on the first physical node, where the application is associated with a logical node. This logical node may include processing resources, storage resources, sensor resources, communication resources, and other similar resources that are spread across multiple physical nodes. Once the request is identified in the first physical node at the application management platform, the first physical node may determine (702) a resource associated with the logical node to support the resource request. Once the resource is identified, operation 700 determines (703) when the resource is located on the first physical node or on another physical node associated with the logical node. When the resource is located on another physical node, operation 700 forwards (704) the request to the other physical node to support the request.

In some implementations, the application management platform executing on the first physical node may include data structures capable of translating resource requests from the applications into addressing information for the physical resources to support the request. As an example, the application may use an application programming interface (API) to request data from an imaging sensor, where the imaging sensor may be allocated an associated identifier by the application. In response to the request, the application management platform may determine a physical sensor associated with the request and forward the request to an appropriate physical node to support the request. Using the example request from application 617 in FIG. 6, management platform 621 may determine a sensor associated with the request and determine whether the sensor is local to physical node 602 or located on physical node 601 that also provides resources to logical node 660. If the sensor were local, management platform 621 may request and obtain the data from the local sensor. In contrast, if the sensor is located on physical node 601, the request may be forwarded to management platform 620. Once received, management platform 620 may obtain the required data and return the data to management platform 621 and application 617.

Although demonstrated in the example of operation 700 as requesting data from a sensor, a management platform may handle requests to various types of resources, where the resources may include storage resources, communication resources, or some other similar type of resource. Additionally, rather than requests for data, the requests may be used to configure a sensor, such as moving an imaging sensor, or may comprise requests to write data to data storage associated with the logical node.

Figure 8:
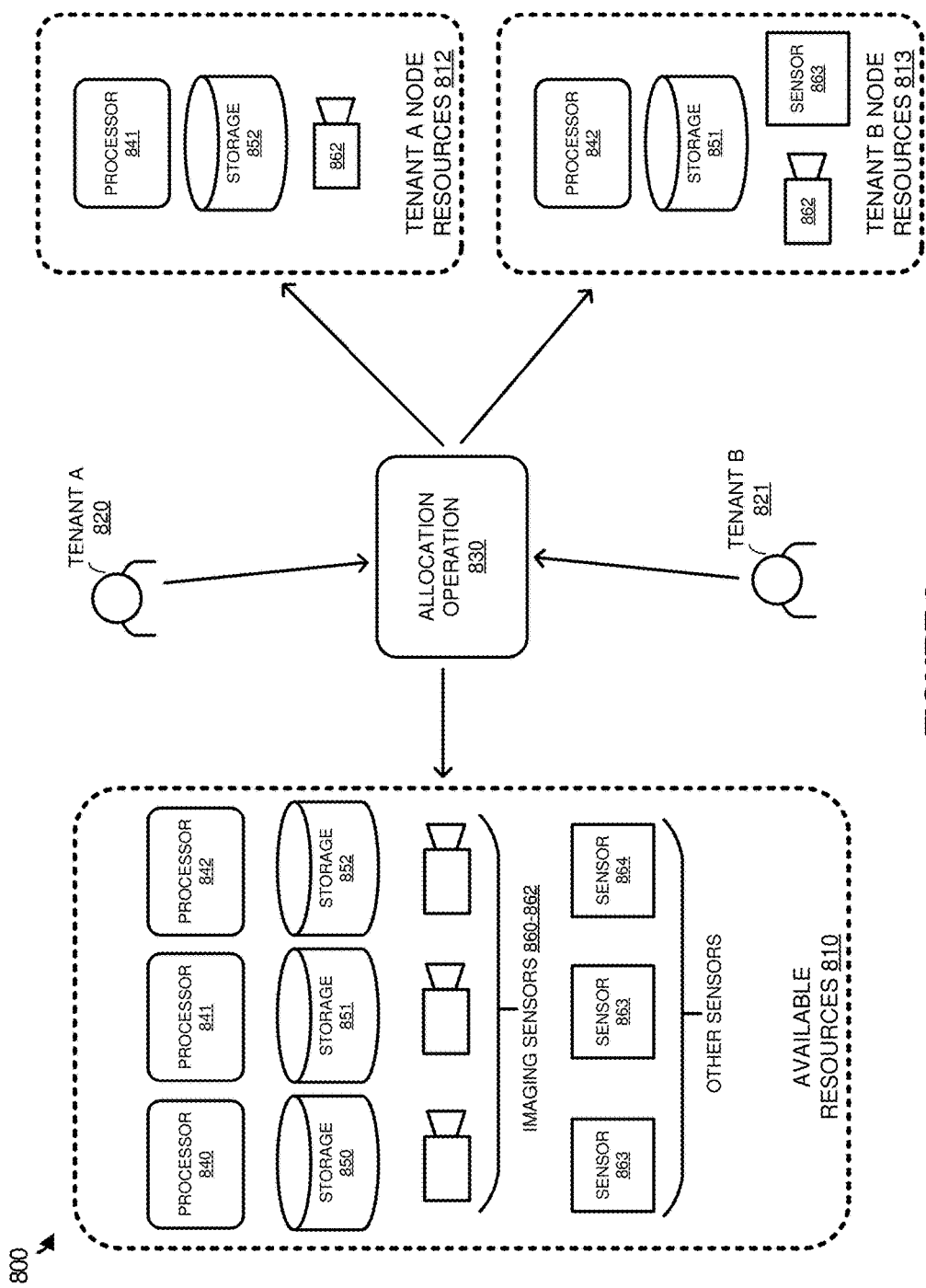
FIG. 8 illustrates an operation of allocating available resources according to an implementation.

FIG. 8 illustrates an operation 800 of allocating available resources to logical nodes according to an implementation. Operation 800 includes available resources 810, allocation operation 830, tenants 820-821, and tenant node resources 812-813. Available resource 810 includes processors 840-842, storage 850-852, and sensors 860-864, where items from available resources 810 may be allocated to tenant node resources 812-813 to operate as part of a logical node.

As described herein, tenants 820-821 may generate an application to be deployed on one or more physical nodes of a converged system. When an application is requested, physical resource requirements may be specified by the tenants, where the physical resource requirements may include processing requirements, storage requirements, sensor requirements, communication requirements, or some other similar type of requirement. In response to the request, allocation operation 830, which may execute as part of a control system for the converged system, may identify resources from available resources 810. In some implementations, tenants 820-821 may specify a minimum quality of service for each of the resources required for the corresponding application. From the minimum quality of service, allocation operation 830 may select resources from available resources 810 to provide the required operations of the application. In other implementations, the tenants may individually select each of the resources for the application, such as a processor of processors 840-842, storage from storage 850-852 (which may be located on the same or different physical nodes), and sensors from sensors 860-864.

Once the resources are selected, allocation operation may generate a node to support the operations of the application. Referring to tenant A node resources 812, tenant 820 is allocated processor 841, storage 852, and imaging sensor 862. Meanwhile, tenant B node resources include processor 842, storage 851, imaging sensor 862, and sensor 863. While demonstrated as providing each tenant their own processor, tenants may share a processor by time division processing, allocation of cores of the processing system, or some other sharing mechanism of a processor. As depicted in operation 800, multiple logical nodes may be allocated the same sensor (sensor 862). To support the access to the sensor, allocation operation 830 may provide time separated access, may permit multiple applications to obtain data from a buffer associated with the sensor simultaneously, or may provide access in any other manner. As an example, when the logical node for tenant A 820 requests data from sensor 862, data may be pulled from a buffer for sensor 862 that caches data for the sensor. Additionally, when the logical node for tenant B 821 requires data for its application, data may be pulled from the same buffer without interfering with the operations of the other node.

Figure 9:
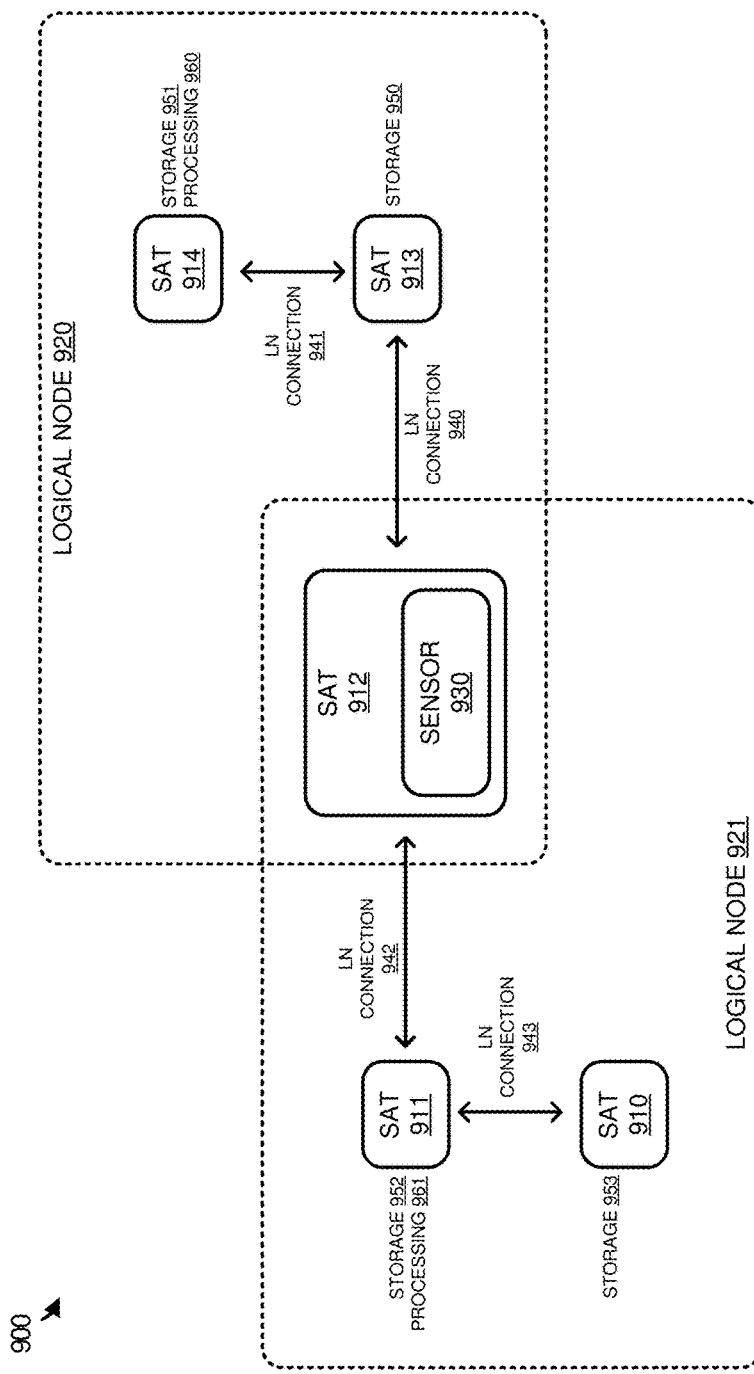
FIG. 9 illustrates a configuration of a converged system to support communications between physical nodes according to an implementation.

FIG. 9 illustrates a configuration 900 of a converged system to support communications between physical nodes according to an implementation. Configuration 900 includes satellites 910-914, which provide resources for logical nodes 920-921. In particular, logical node 920 includes satellites 912-914 with sensor 930, storage 950-951, and processing 960 capable of executing at least one application for logical node 920. Logical node 921 includes satellites 910-912 with sensor 930, storage 952-953, and processing 961 capable of executing at least one application for logical node 921.

In operation, tenants may deploy logical nodes to provide various operations in a converged satellite system, where the logical nodes may each execute via resources on one or more physical nodes, such as satellites 910-914. In the present implementation, to provide the communications required for the logical nodes, logical network connections 940-943 (LN connections) are established to provide secure communications. In some implementations, LN connections 940-943 may transport encapsulated data between physical nodes that provide a platform for the logical node. These encapsulated packets may be transported using various encryption processes, such as symmetric encryption algorithms, asymmetric encryption algorithms, block ciphers, PKI encryption, one-time pad encryptions, AES, RSA encryption, public-key cryptography, or 3DES, among others. In some implementations, LN connections 940-743 may be representative of a private network links that provide data communications for each logical node of logical nodes 920-921, wherein LN connections 940-941 correspond to logical node 920 and LN connections 942-943 correspond to logical node 921.

As an example, an application executing on satellite 911 may generate a request to store data in storage 953 of satellite 910. In response to the request, which may be identified by an application management platform on satellite 911, the application management platform may determine that the storage location is on another satellite and generate at least one packet to transport the required data. This packet may include the requested data to be stored and an address in storage 953 corresponding to the request. Additionally, the application platform service may encrypt the data for the storage request and may generate a header for the packet, where the header may include an identifier for the logical node associated with the request (logical node 921), source and destination physical node information (identifiers for satellites 911 and 910), a hash to validate the data write, or some other similar information.

Once a packet is generated, the packet may be communicated from satellite 911 to satellite 910. After receiving the packet, the application management service on satellite 910 may decapsulate the packet to identify the data write request in the payload and perform the request for storage 953. In at least one example, when the packet is received, satellite 910 may use identifier information, such as the identifier information for logical node 921 to decrypt the payload of the packet, where the identifier may be associated with an encryption key to decrypt the payload of the packet. Once decrypted, the application management service may store the required data to support the operation.

As depicted in configuration 900, at least a portion of the resources allocated to a logical node may be allocated to multiple nodes. In particular, sensor 930 corresponds to both logical node 920 as well as logical node 921. In some implementations, sensor 930 may be accessible at different time intervals for logical nodes 920-921. In other implementations, logical nodes 920-921 may access the data of sensor 930 at the same time. This data may be obtained from a buffer associated with the sensor, where the available data from the sensor may be the same for each of the logical nodes, permitting the applications associated with the logical nodes to process the same data in different manners.

While demonstrated in the example of configuration 900 with a single LN connection between the physical satellites 910-914, multiple LN connections may exist between the physical nodes to provide communications for multiple logical nodes. As an example, if satellite 913 further included another sensor for logical node 921, a second logical connection associated with logical node 921 may be established between satellite 912 and satellite 913 to obtain the required data from the sensor located on satellite 913. In differentiating between packets associated with logical node 920 and logical node 921, the packets may include a logical node or application identifier associated with the logical node, a hash to verify the identity of the packet and/or the logical node associated with the packet, or some other similar identifier information. In at least one implementation, when data is encapsulated for transmission between physical satellites, the packet may include a header that defines a source satellite, a destination satellite, an identifier for the logical node associated with the data, or some other similar information. Consequently, packets that correspond to logical node 920 may be distinguished from packets associated with logical node 921.

Although demonstrated as direct connections, it should be understood that LN connections may be established with one or more intermediary physical nodes or satellites. In some implementations, physical satellites that are part of the same logical node may be incapable of communication without a connection involving one or more additional intermediary satellites. As a result, the intermediary satellites may be used to forward packets to a destination satellite based at least on a destination satellite identifier in the packet. Additionally, while demonstrated in the example of FIG. 9 with satellites, other physical nodes may operate in a converged system to provide a logical node. These physical nodes may include airborne devices, water-borne devices, land vehicles, or some other physical node.

Figure 10:
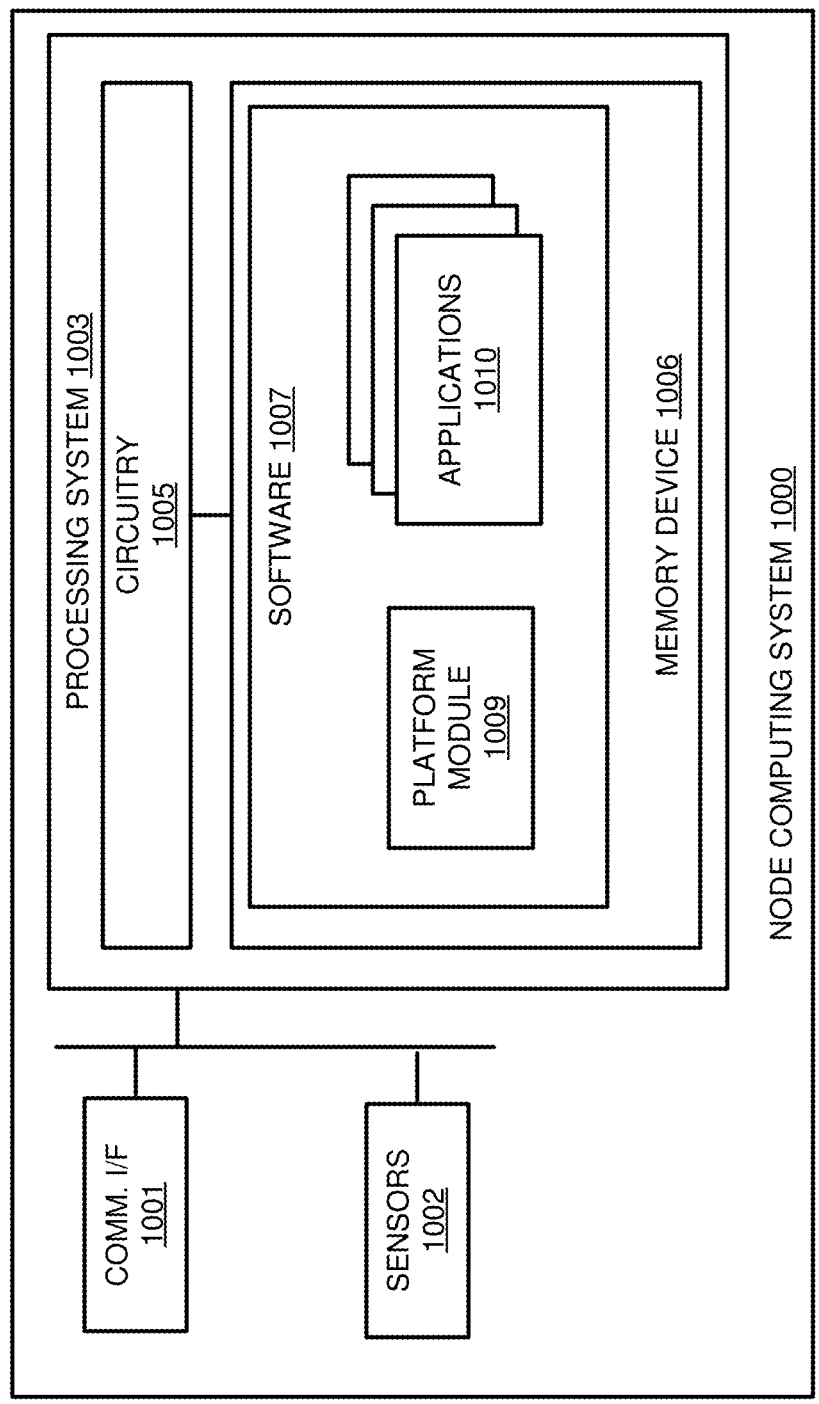
FIG. 10 illustrates a node computing system according to an implementation.

FIG. 10 illustrates a node computing system 1000 according to an implementation. Computing system 1000 is representative of any computing system or systems with which the various operational architectures, processes, scenarios, and sequences disclosed herein for a physical node may be implemented. Computing system 1000 is an example of physical nodes 110-113, 120-123, and 130-131 in FIG. 1, although other examples can be employed. Computing system 1000 comprises communication interface 1001, sensors 1002, and processing system 1003. Processing system 1003 is linked to communication interface 1001 and sensors 1002. Sensors 1002 may comprise imaging sensors, heat sensors, proximity sensors, acoustic sensors, vibration sensors, light sensors, or some other similar type of sensor. Processing system 1003 includes processing circuitry 1005 and memory device 1006 that stores operating software 1007. Computing system 1000 may include other components such as a power system, photovoltaic solar panels, battery, and enclosure that are not shown for clarity.

Communication interface 1001 comprises components that communicate over communication links, such as network cards, ports, radio frequency (RF), processing circuitry and software, or some other communication devices. Communication interface 1001 may be configured to communicate over conductive, wireless, or optical links. Communication interface 1001 may be configured to use Time Division Multiplex (TDM), Internet Protocol (IP), Ethernet, optical networking, wireless protocols, communication signaling, or some other communication format, including combinations thereof. In at least one implementation, communication interface 1001 may be used to communicate with a control system and one or more other physical nodes in a converged system, where the physical nodes may comprise mobile or stationary devices, such as satellites, drones, airplanes, or balloons, land and water vehicles, stationary surface or sub-surface nodes, or some other devices.

Processing circuitry 1005 comprises microprocessor and other circuitry that retrieves and executes operating software 1007 from memory device 1006. Memory device 1006 may include volatile and nonvolatile, removable and non-removable media implemented in any method or technology for storage of information, such as computer readable instructions, data structures, program modules, or other data. Memory device 1006 may be implemented as a single storage device, but may also be implemented across multiple storage devices or sub-systems. Memory device 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 1005 is typically mounted on a circuit board that may also hold memory device 1006 and portions of communication interface 1001 and user interface 1002. Operating software 1007 comprises computer programs, firmware, or some other form of machine-readable program instructions. Operating software 1007 includes platform module 1009 and application 1010, although any number of software modules may provide a similar operation. Operating software 1007 may further include an operating system, utilities, drivers, network interfaces, applications, or some other type of software. When executed by processing circuitry 1005, operating software 1007 directs processing system 1003 to operate computing system 1000 as described herein.

In one implementation, platform module 1009 directs processing system 1003 to maintain a platform for applications 1010, where applications 1010 each operate as part of logical nodes in a system of physical nodes. In particular, communication interface 1001 may receive configuration data from other physical nodes or a control system to provide the operations of the logical nodes. Once the configuration data is provided, applications 1010 may execute via processing system 1003 to provide the required operations of the various logical nodes. In some examples, the configuration data for a logical node may include the application, as well as physical resource information for the logical node, where the physical resource information may define processing resources, storage resources, sensor resources, and communication resources, among other resource types.

In at least one implementation, each of the logical nodes may require resources across multiple physical nodes, where the logical nodes may require processing resources, data storage resources, communication resources, sensor resources, or some other similar resources spread across one or more physical nodes. For example, a first application in applications 1010 may execute on node computing system 1000, but use sensors from one or more other physical nodes in the system. Consequently, platform module 1009 may be used to monitor interactions between the sensors and the corresponding application, and act as a transparent intermediary that provides the required data as described herein.

Figure 11:
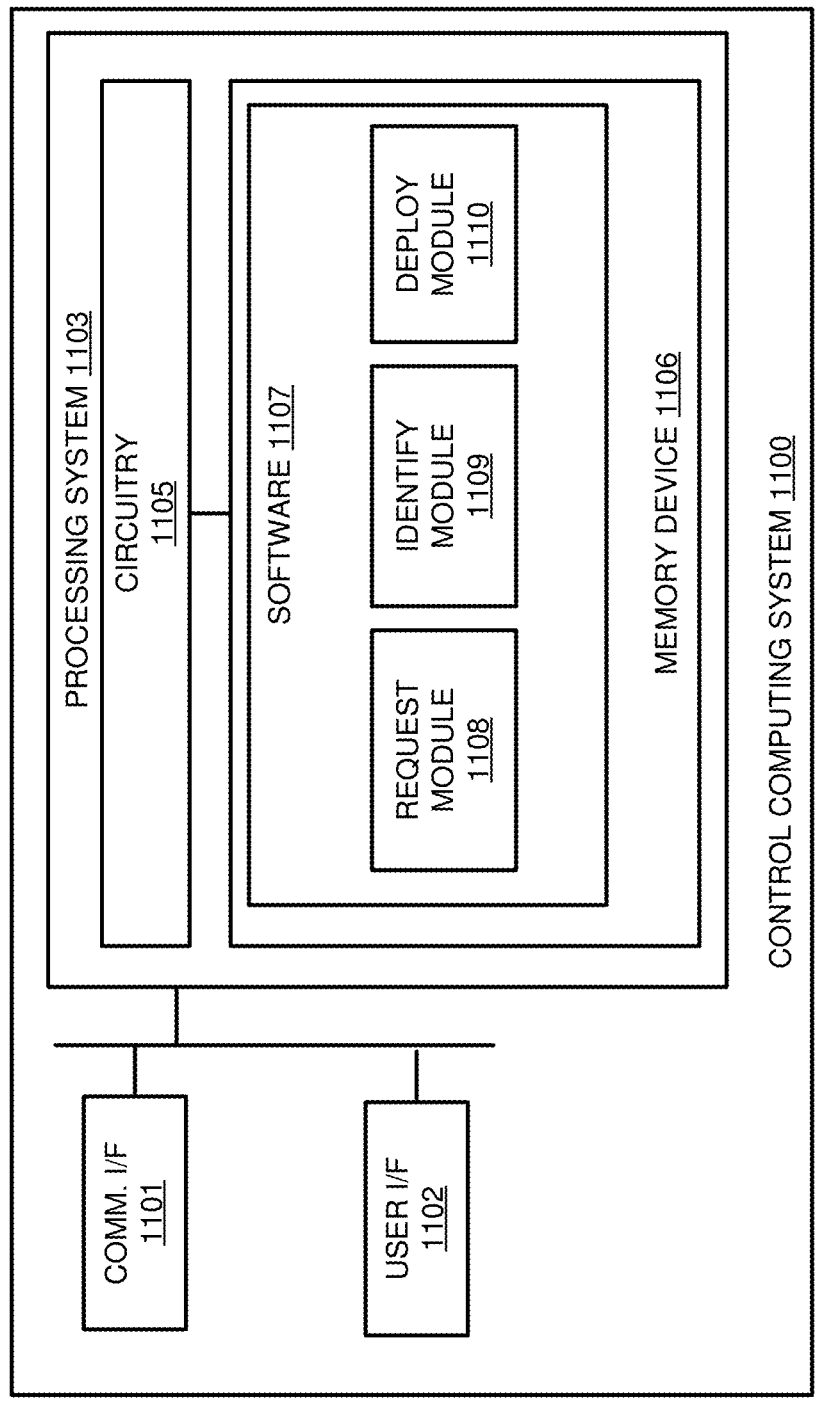
FIG. 11 illustrates a control computing system according to an implementation.

FIG. 11 illustrates a control computing system 1100 according to an implementation. Computing system 1100 is representative of any computing system or systems with which the various operational architectures, processes, scenarios, and sequences disclosed herein for a control system may be implemented. Computing system 1100 is an example of control system 170 in FIG. 1 or control system 570 in FIG. 5, although other examples may exist. Computing system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Computing system 1100 may include other components such as a power system, battery, and enclosure that are not shown for clarity.

Communication interface 1101 comprises components that communicate over communication links, such as network cards, ports, radio frequency (RF), processing circuitry and software, or some other communication devices. Communication interface 1101 may be configured to communicate over metallic, wireless, or optical links. Communication interface 1101 may be configured to use Time Division Multiplex (TDM), Internet Protocol (IP), Ethernet, optical networking, wireless protocols, communication signaling, or some other communication format, including combinations thereof. In at least one implementation, communication interface 1101 may be used to communicate with various physical nodes to configure and obtain data from the various physical nodes.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus, including combinations thereof. User interface 1102 may comprise one or more APIs, web interfaces, terminal interfaces, graphical and text-based user interfaces, among other elements provided over a local display or network link. User interface 1102 may be omitted in some examples.

Processing circuitry 1105 comprises microprocessor and other circuitry that retrieves and executes operating software 1107 from memory device 1106. Memory device 1106 may include volatile and nonvolatile, removable and non-removable media implemented in any method or technology for storage of information, such as computer readable instructions, data structures, program modules, or other data. Memory device 1106 may be implemented as a single storage device, but may also be implemented across multiple storage devices or sub-systems. Memory device 1106 may comprise additional elements, such as a controller to read operating software 1107. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 1105 is typically mounted on a circuit board that may also hold memory device 1106 and portions of communication interface 1101 and user interface 1102. Operating software 1107 comprises computer programs, firmware, or some other form of machine-readable program instructions. Operating software 1107 includes request module 1108, identify module 1109, and deploy module 1110, although any number of software modules may provide a similar operation. Operating software 1107 may further include an operating system, utilities, drivers, network interfaces, applications, or some other type of software. When executed by processing circuitry 1105, operating software 1107 directs processing system 1103 to operate computing system 1100 as described herein.

In one implementation, request module 1108 directs processing system 1103 to identify a request for a logical node. In response to the request, identify module 1109 directs processing system 1109 to identify physical nodes in a system capable of providing the resources for the logical node, where the resources may include processing resources, storage resources, sensor resources, communication resources, or some other resource. In identifying the physical nodes, identify module 1109 may determine what resources are available, or not allocated to another logical node, and select resources that provide the required resources for the logical node. In some implementations, each of the logical nodes may comprise at least one application that executes via an application management platform on the selected physical nodes and may further include at least one sensor on the selected physical nodes that provides data to the at least one application. These sensors may comprise imaging sensors, temperature sensors, or some other type of sensors.

Once the physical nodes are selected to support the logical node, deploy module 1110 may deploy or distribute configuration data to support the implementation of the logical node. In some implementations, deploy module 1110 may communicate with a first physical node that can then distribute required data to other nodes in the converged system. For example, deploy module 1110 may transmit the configuration data to a first satellite capable of communication with control computing system 1100, and provide a request to the satellite to distribute configuration data to one or more other satellites or other physical nodes of the converged system. The configuration data may include application management platform information indicating physical resources that should be allocated to the logical node, and may further include the application that executes using the allocated physical resources.

In some implementations, in addition to an initial configuration of the logical node, computing system 1100 may modify the configuration of the logical node based on a request for a new logical node, a failure of a physical node, an addition of a physical node, or some other similar modification event. In response to the event, deploy module 1110 may transfer configuration information to the application management platform and modify the resources allocated to the logical node. This configuration modification may transition the logical node from using a first sensor on a first physical node to using a second sensor on a second physical node, may add physical storage addressable by the application associated with the logical node, or may provide some other similar configuration modification.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying a request to deploy a logical node, wherein the logical node comprises a software-defined representation of a physical node distributed across two or more physical nodes;
identifying physical requirements of the logical node, wherein the physical requirements comprise at least sensor requirements associated with the logical node;
selecting physical nodes from a plurality of physical nodes to support the physical requirements of the logical node, wherein a first physical node of the physical nodes is selected to execute an application for the logical node and at least one second physical node of the physical nodes is selected based on sensors capable of providing sensor data to the application; and
distributing configuration data to the physical nodes to implement the logical node, wherein at least one of the physical nodes comprises a device in motion, and wherein the configuration data comprises the application for the logical node and physical resource allocation information associated with the logical node.

2. The method of claim 1, wherein the physical requirements comprise at least one among storage resource requirements and processing resource requirements.

3. The method of claim 1, wherein the physical requirements comprise geographic areas of interest for sensor data.

4. The method of claim 1, wherein the physical nodes comprise at least two among orbiting satellite devices, mobile atmospheric devices, tethered atmospheric devices, and mobile surface-based devices.

5. The method of claim 1, wherein the physical nodes comprise at least one satellite device and at least one airborne device.

6. The method of claim 1, wherein distributing the configuration data to the one or more physical nodes comprises:
communicating the configuration data to a first physical node of the plurality of physical nodes;
communicating a request to the first physical node to distribute the configuration data to further physical nodes.

7. The method of claim 1, wherein the method further comprises initiating execution of the application.

8. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
identify a request to deploy a logical node, wherein the logical node comprises a software-defined representation of a physical node distributed across two or more physical nodes;
identify physical requirements of the logical node, wherein the physical requirements comprise at least sensor requirements associated with the logical node;
select physical nodes from a plurality of physical nodes to support the physical requirements of the logical node, wherein a first physical node of the physical nodes is selected to execute an application for the logical node and at least one second physical node of the physical nodes is selected based on sensors capable of providing sensor data to the application; and
distribute configuration data to the physical nodes to implement the logical node, wherein at least one of the physical nodes comprises a device in motion, and wherein the configuration data comprises the application for the logical node and physical resource allocation information associated with the logical node.

9. The apparatus of claim 8, wherein the physical requirements comprise at least one among storage resource requirements and processing resource requirements.

10. The apparatus of claim 8, wherein the physical requirements comprise geographic areas of interest for sensor data.

11. The apparatus of claim 8, wherein the physical nodes comprise at least two among orbiting satellite devices, mobile atmospheric devices, tethered atmospheric devices, and mobile surface-based devices.

12. The apparatus of claim 8, wherein the physical nodes comprise at least one satellite device and at least one airborne device.

13. The apparatus of claim 8, wherein distributing the configuration data to the one or more physical nodes comprises:
communicating the configuration data to a first physical node of the plurality of physical nodes;
communicating a request to the first physical node to distribute the configuration data to further physical nodes.

14. The apparatus of claim 8, wherein the method further comprises initiating execution of the application.

15. A system comprising:
a plurality of physical nodes;
a control system configured to:
identify a request to deploy a logical node, wherein the logical node comprises a software-defined representation of a physical node distributed across two or more physical nodes;
identify physical requirements of the logical node, wherein the physical requirements comprise at least sensor requirements associated with the logical node;
select physical nodes from the plurality of physical nodes to support the physical requirements of the logical node, wherein a first physical node of the physical nodes is selected to execute an application for the logical node and at least one second physical node of the physical nodes is selected based on sensors capable of providing sensor data to the application; and
distribute configuration data to the physical nodes to implement the logical node, wherein the configuration data comprises the application for the logical node and physical resource allocation information associated with the logical node.

16. The system of claim 15, wherein the physical requirements comprise at least one among storage resource requirements and processing resource requirements.

17. The system of claim 15, wherein the physical requirements comprise geographic areas of interest for sensor data.

18. The system of claim 15, wherein the physical nodes comprise at least one among orbiting satellite devices, mobile atmospheric devices, tethered atmospheric devices, and mobile surface-based devices.

* * * * *